Oct. 2, 1951

H. T. HUNTER 2,570,127

APPARATUS FOR DEEP FAT COOKING

Filed April 13, 1948

INVENTOR
HERBERT T. HUNTER
BY
Schaines + Lieberman
ATTORNEYS.

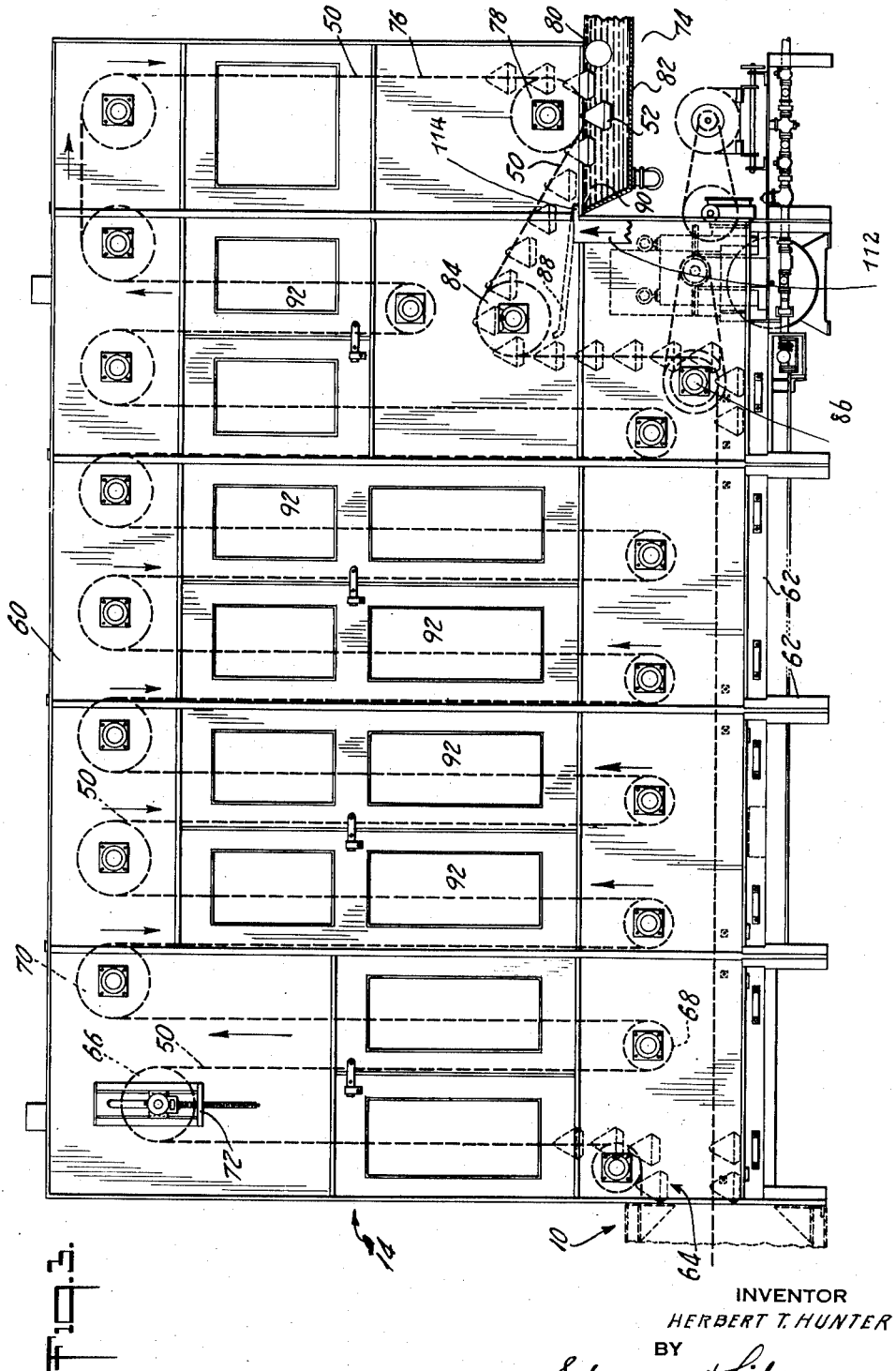

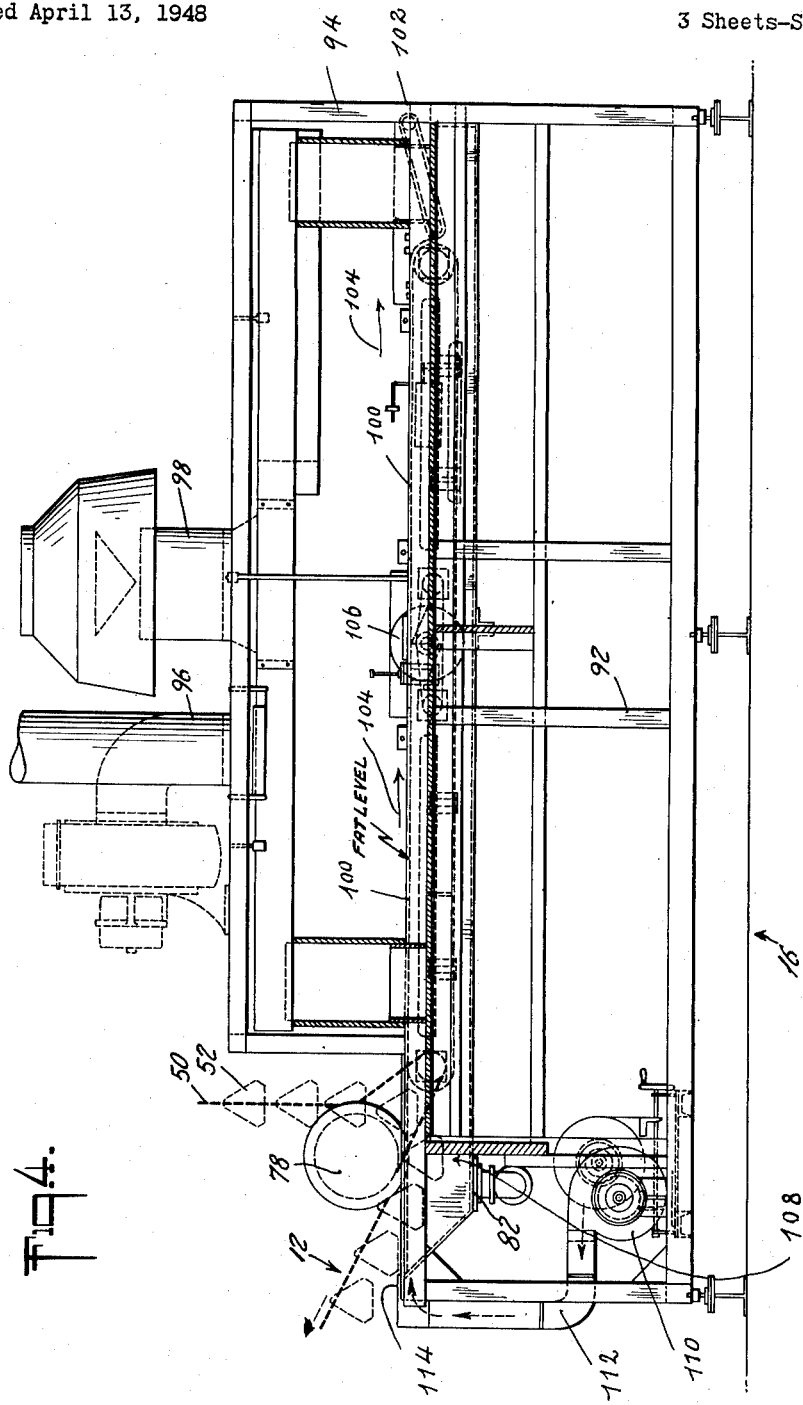

Patented Oct. 2, 1951

2,570,127

UNITED STATES PATENT OFFICE 2,570,127

APPARATUS FOR DEEP FAT COOKING

Herbert Thomas Hunter, Baltimore, Md., assignor to Doughnut Corporation of America, New York, N. Y., a corporation of New York Application April 13, 1948, Serial No. 20,675

6 Claims. (Cl. 99—352)

The present invention relates generally to the deep fat cooking of foods, and in particular it relates to the deep fat cooking of yeast-raised doughnuts or similar comestibles.

The purpose or object of the present invention, broadly expressed, is the provision of an apparatus for forming the raw yeast-containing doughnuts, proofing them, and thereafter frying the same, all in the one apparatus. Machines for this purpose have been known in the past but have never been commercially practical or acceptable. There are presently available machines which form, proof and fry doughnuts, yeast-raised and otherwise, and the present invention does not involve these per se, except as part of the apparatus as a whole wherein the doughnut rings are formed, proofed and then delivered to the frying chamber for final treatment.

A specific object of the present invention relates to the method and apparatus of handling and delivering the proofed doughnuts to the frying chamber, wherein the direction of movement of the doughnuts is reversed.

Another specific object of the present invention is the provision of air blast means to shift the proofed doughnuts into the path of the conveyors in the frying vat.

Other objects of the present invention will in part be obvious from the following description of an illustrative embodiment, and in part specifically pointed out hereinafter.

In the drawings annexed hereto, forming a part hereof,

Fig. 3 is a side elevational view of the proofing chamber and transport mechanism therewithin; and Fig. 4 is a side elevational view of the frying chamber, illustrating the transfer mechanism in relation thereto.

Figure 1:
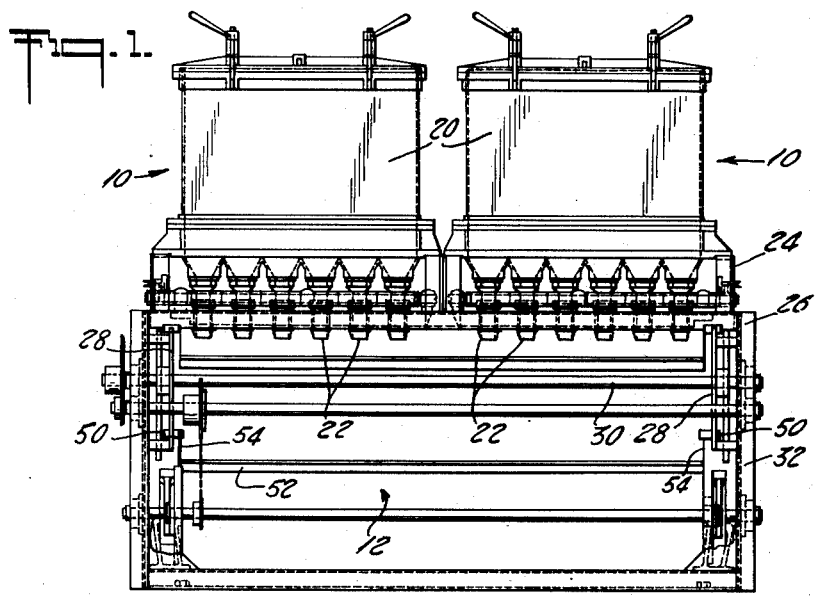
Figure 1 is an end elevational view of the raw doughnut forming devices.

The apparatus of the present invention comprises a doughnut cutter mechanism indicated generally by reference numeral 10, a transfer and transport mechanism indicated generally by reference numeral 12, a proofing chamber 14, and a frying kettle 16.

Figure 2:
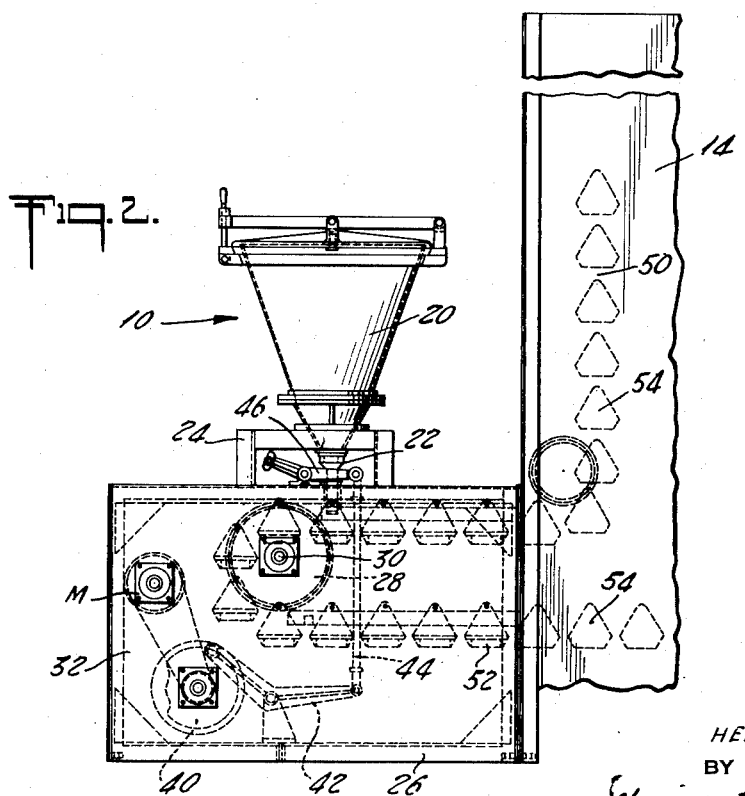
Fig. 2 is a side elevational view of the doughnut forming mechanism, including a portion of the proofing chamber and the transfer mechanism.

The cutter mechanism 10, which forms the raw doughnut shapes, comprises, as shown in Figs. 1 and 2, a number of raw mix containers 20, 20, having cutting sleeves 22, 22 at the bottom thereof. Each container 20 may be provided with a number of sleeves 22, 22 (six being shown, for example) arranged in line transversely across the support bracket 24 and frame 26 on which the containers are mounted. A motor M is provided, which, through cam 40, pivoted lever 42, link 44 and lever 46, actuates all the sleeves 22, 22 simultaneously, so that a number of raw doughnut shapes will be formed and dropped from sleeves 22 at one time.

A pair of toothed drive wheels 28, 28 at opposite ends of a shaft 30, are mounted within frame 26, rearwardly of and below the sleeves 22, 22. A pair of linked endless belts 50, 50 are supported and carried by drivers 28, 28 as will be described in more detail below.

A plurality of carrier shelves or trays 52, 52 are munted on belts 50, 50, depending therefrom by means of short side plates 54, 54, which are so connected to chains 50, 50 as to permit shelves 52, 52 to swing freely about the points of connection. The simultaneous movement of chains 50, 50 is so synchronized with the operation of the cutter sleeves 22, 22 as to bring a carrier shelf 52 below and in vertical alignment with the cutter sleeves when the raw doughnut forms are delivered therefrom.

Adjacent the cutter mechanism 10, and in communication therewith, is mounted the proofing chamber 14. This comprises a large chamber 60, which may be formed of thin, light gauge metallic sheets or otherwise, mounted on a support indicated at 62. The width of chamber 60 is such as to accommodate carrier shelves 52, 52 therewithin; the height and length depend on the nature of the commodity to be processed.

Those mixes containing yeast must be "proofed" prior to frying or heat treating; that is, the yeast must be given an opportunity to ferment and bloom within the raw article. This proofing, of necessity, requires a certain amount of time, and this time is occupied by the movement of the raw doughnut forms in a proofer, as 14, between formation and frying. The carrier shelves or trays 52, 52 are supported on chains 50, 50 from frame 26 into the entrance side of chamber 60, at the bottom thereof, as at 64 (Fig. 3) and thence vertically upward, around idler rollers 66, 66, near the roof of chamber 60, thence downwardly and upwardly about idler rollers 68, 68 near the floor of the chamber, thence upwardly and over idlers 70, 70, following the course of the arrows. Means are provided, as indicated at 72 to raise or lower certain of the idlers as 66, 66, to compensate for any slack or looseness in chains 50, 50.

Chamber 60 is completely sealed, except at the entrance 64 at one end, and at the exit or discharge opposite end 74 thereof. Access may be provided to the interior of chamber 60, as by doors 92, 92 for needed repairs or adjustments. It is to be noted that the discharge end 74 of chamber 60 is formed by a recess in the lower portion of the chamber, or a cut-out therefrom (see Fig. 3). The frying mechanism 16 is so formed as to fit into this cut-out or recessed portion of chamber 60.

At the exit end of chamber 60, the last reach 76 of chains 50, 50 is downward (see right-hand side of Fig. 3) to a pair of driver rollers 78, 78 disposed closely adjacent the edge 80 of the exit opening, and around said rollers. The carrier shelves 52, 52 hanging from the endless chains 50, 50 thus depend well into the tray 82 component of fryer 16. The operation at this point will be described in detail below.

Chains 50, 50 after passing over rollers 78, 78 are directed upwardly and rearwardly to a pair of idlers 84, 84 within chamber 60, thence vertically downward to another pair of drive rollers 86, 86 and thence horizontally along the floor of chamber 60 through opening 64 into housing 26 about drivers 28, 28. The reverse, upwardly-angled path of travel of belts 50, 50 between rollers 78, 78 and 84, 84 is provided in order to drain the carrier shelves or trays 52, 52 of the frying oil in which the carrier shelves are immersed as they depend from the belts passing over rollers 78, 78. A downwardly angled drip pan 88 is provided, its lower lip 90 extending into tray 82 to collect the drippings and return them to the frying tray 82.

Fryer 16 comprises a flat kettle 82, supported within a framework 92 and having a superposed enclosure 94 above the tray. Exhaust means as indicated at 96, 98 may be provided to draw off objectionable frying odors. As will be apparent from Figs. 3 and 4, fryer component 16 extends outwardly from proofer 14. The course of movement of the conventional endless chain conveyor 100 at the surface of the frying kettle 82 is from the point at which the proofed articles are immersed, lengthwise of the frying vat, toward the discharge end 102; that is, the chain conveyor moves in the direction of arrows 104, 104. A conventional turn-over mechanism 106 is disposed transversely of kettle 82, at the midpoint thereof, as will be readily understood.

Conveyor chains 50, 50 and trays 52, 52, however, move in a direction other than that in which the frying conveyor chains 100 move, at least from the point of immersion of the loaded trays as at 108. The proofed articles will tend to move, in the liquid fat, in the same reverse direction. I overcome this tendency by the provision of means to change the direction of movement of the proofed articles. Referring now to Figs. 3 and 4, I provide an air blower 110, disposed within frame 92, and an air duct 112 therefrom terminating in a nozzle 114 resting on the edge of kettle 82 directed on the fat surface and lengthwise of the kettle. As the yeast-proofed articles are immersed in the hot fat, they will rise to the surface, at which point the air blast from nozzle 114 will cause them to move into the path of the transversely disposed blades of the conveyor chains 100, 100.

The rest of the operation will be obvious to one skilled in the art. It will be plain, however, that with my mechanism as a whole, it is possible to cut doughnut shapes, support them through the proofing stage so that they will bloom, and transfer them to a frying chamber for final treatment without and difficulty or complex mechanism.

Having described my invention, what I claim and desire to secure by Letters Patent is:

1. In apparatus of the character described for deep fat cooking, a former, a proofer, and a deep fat cooking kettle, the former being in communication with the proofer at one end thereof, the proofer at the other end thereof being in communication with the fryer, a carrying device adapted to support trays bearing the raw shaped articles to be cooked from the former through the proofer and into the kettle, the carrying device moving downwardly towards and into the kettle, and rearwardly therefrom towards the former, means in the kettle to move the articles to be treated lengthwise thereof from the end thereof associated with the proofer to the opposite delivery end thereof, and air blast means to move the articles to be cooked into the path of the moving means in the kettle.

2. In apparatus of the character described for deep fat cooking, a former, a proofer, and a deep fat cooking kettle, the former being in communication with the proofer at one end thereof, the proofer at the other end thereof being in communication with the fryer, a carrying device adapted to support trays bearing the raw shaped articles to be cooked from the former through the proofer and into the kettle, the carrying device moving downwardly in the proofer at the end thereof associated with the kettle towards and into the kettle to deposit therewithin the articles to be cooked, and rearwardly therefrom towards the former, means in the kettle to move the articles to be treated lengthwise thereof from the end thereof associated with the proofer to the opposite delivery end thereof, and means to move the articles to be cooked into the path of the moving means in the kettle, comprising an air blower directed on the kettle surface towards the delivery end thereof.

3. In apparatus of the character described for deep fat cooking, a former, a proofer, a deep fat-containing kettle, and a carrying device for the articles to be cooked, the former being in communication with the proofer at one end thereof, the proofer at the other end thereof being in communication with the kettle, the carrying device moving horizontally underneath the former to receive and support thereon the articles to be cooked, thence into and through the proofer and into the kettle, the path of the carrier being vertically downward in the proofer at the end thereof associated with the kettle, towards and into the kettle below the fat level to deposit therewithin the articles to be cooked, and thence rearwardly towards the former end of the proofer, first means in the kettle to move the articles to be treated from the receiving end thereof lengthwise of the kettle towards the delivery end thereof, and positively operating second means independent of the last-named means to reverse the direction of movement of the deposited articles by urging them from the proofer end of the kettle towards the opposite end thereof and into the path of the first means.

4. In apparatus as in claim 3, in which the direction changing means comprise an air blast directed against the deposited articles.

5. In apparatus as in claim 3, in which the direction changing means comprise an air blast directed lengthwise of the cooker from the receiving end thereof towards the delivery end.

6. In apparatus of the character described for deep fat cooking, a former, a proofer, and a deep fat-containing cooking kettle, the former being in communication with the proofer at one end of the proofer, the kettle being in communication with the proofer at the other end thereof, a carrying device adapted to support trays bearing the raw shaped articles to be cooked from the former, through the proofer and thence into the kettle, the path of the carrying device at the end of the former adjacent the kettle being directed downwardly and into the kettle to a point below the fat level therewithin and thence upwardly and out of the kettle and towards the end of the proofer adjacent the former, first means in the kettle to move the articles to be treated lengthwise thereof from the end associated with the proofer to the opposite delivery end thereof, and positively operating second means, independent of the first means, associated with the kettle to move the articles to be treated therein into the path of the first means.

HERBERT THOMAS HUNTER.

REFERENCES CITED

The following references are of record in the file of this patent:

UNITED STATES PATENTS

| Number | Name | Date |
|---|---|---|
| 2,055,639 | Scheibel | Sept. 29, 1936 |
| 2,219,410 | Bradshaw | Oct. 29, 1940 |